United States Patent
Mir

(10) Patent No.: US 7,323,833 B2
(45) Date of Patent: Jan. 29, 2008

(54) VOLTAGE MODE CONTROL WITH PHASE ADVANCING FOR POSITION CONTROLLED ELECTRIC MACHINES

(75) Inventor: Sayeed A. Mir, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 393 days.

(21) Appl. No.: 11/122,687

(22) Filed: May 5, 2005

(65) Prior Publication Data

US 2007/0108937 A1    May 17, 2007

(51) Int. Cl.
  H02P 1/54   (2006.01)
  H02P 5/00   (2006.01)
  H02P 5/46   (2006.01)
(52) U.S. Cl. ............... 318/100; 318/432; 318/434
(58) Field of Classification Search ............ None
   See application file for complete search history.

(56) References Cited

U.S. PATENT DOCUMENTS 7,053,581 B2* 5/2006 Chen et al. ............ 318/609

2005/0212471 A1* 9/2005 Patel et al. ............ 318/432
2005/0285556 A1* 12/2005 Chen et al. ............ 318/432

* cited by examiner

Primary Examiner—Lincoln Donovan
Assistant Examiner—Erick Glass
(74) Attorney, Agent, or Firm—Michael D. Smith

(57) ABSTRACT

A method and system for controlling an electric machine using voltage mode control comprising: receiving a voltage command, the voltage command corresponding to a voltage control command for a position control loop, the position control loop configured to control a position of the electric machine; receiving a motor velocity signal; and determining a q-axis current. The method also includes computing a d-axis current to supplement the torque if a magnitude of a voltage supply for exciting the electric machine is not sufficient to provide a torque corresponding to the q-axis current, otherwise establishing the d-axis current at about zero; and generating command voltages for controlling the electric machine corresponding to the q-axis current and the d-axis current.

26 Claims, 3 Drawing Sheets

VOLTAGE MODE CONTROL WITH PHASE ADVANCING FOR POSITION CONTROLLED ELECTRIC MACHINES

TECHNICAL FIELD

This invention relates to electric machines, and more particularly, to voltage mode control with phase advancing for position controlled operation.

BACKGROUND OF THE INVENTION

Electric Steering applications such as Electric Power Steering (EPS), four wheel steering e.g., Quadrasteer (Qsteer) Active Front Steer (AFS), Active Rear Steer (ARS) are used in vehicles to improve performance fuel economy and stability of the vehicle. Commonly, in such systems an electronic controller is configured to drive an electric motor to provide torque, speed or positioning control.

Steering applications such as AFS and Quadrasteer™ utilize motor position control. It is desirable to use a brushless permanent magnet (PM) motor in such applications for its higher efficiency and high torque density. Generally, the motor can be designed and controlled to exhibit a sinusoidal back EMF (electromotive force), which provides smoother torque feel or a trapezoidal back EMF, which while easier to control, can suffer from commutation ripple and noise. The sinusoidal back EMF motor can be controlled utilizing phase advance, thus further reducing the size of the motor. Therefore, it is often desirable to use brushless permanent magnet motors with sinusoidal back EMF for these applications. Brushless permanent magnet motors can be position controlled employing either current mode control or voltage mode control.

Voltage mode control advantageously, provides damping when applied voltage is not compensated for back EMF. In voltage mode control, the voltage command to the motor is primarily a function of application control variables disregarding the motor characteristics. In addition, voltage mode control systems may be desirable in certain applications because the need for external sensors to provide feedback is minimized. Unfortunately, however, with voltage mode control the torque, and therefore, the current flowing through the motor is not measured or controlled. For position control applications using voltage command, the voltage is a direct function of the position error, therefore, a high voltage is applied across the motor winding at high position errors while a small voltage is applied for small position motor irrespective of motor velocity. By the principal of the operation of the motor, the voltage applied across the motor is function of motor torque and the back EMF of the motor. At very low velocity, even small voltage applied across the motor can result into high torques and therefore high current. At higher voltage and low velocity, the torque, and thereby the current of the motor can be several times a motors rating. Steering control systems employing voltage mode control algorithms, generally do not use the motor phase current for torque control. Moreover, it may be beneficial to limit motor torque and current to avoid exceeding motor or controller ratings.

Furthermore, with this control scheme, the phase advance angle, which is the angle between motor back-EMF and voltage, is not controlled. In most cases the voltage is controlled to be in phase with back-EMF. However, this type of control may result in un-necessary d-axis current in the motor, contributing to increased motor losses. Likewise, at command voltage levels where the desired command voltage becomes greater than the DC bus voltage, the torque output of the motor is limited, as the motor current cannot be further increased due to the voltage limit. This either forces to increase the motor size to meet the required torque at higher speeds or limits the operation of the drive to low speed thus degraded performance.

SUMMARY OF THE INVENTION

Disclosed herein in an exemplary embodiment is a method of controlling an electric machine using voltage mode control comprising: receiving a voltage command, the voltage command corresponding to a voltage control command for a position control loop, the position control loop configured to control a position of the electric machine; receiving a motor velocity signal; and determining a q-axis current. The method also includes computing a d-axis current to supplement the torque if a magnitude of a voltage supply for exciting the electric machine is not sufficient to provide a torque corresponding to the q-axis current, otherwise establishing the d-axis current at about zero; and generating command voltages for controlling the electric machine corresponding to the q-axis current and the d-axis current.

Also disclosed herein in another exemplary embodiment is a voltage mode control system for an electric machine comprising: a power inverter operationally connected to the electric machine; a position sensor operationally connected to the electric machine, the position sensor configured to transmit a signal indicative of position of the electric machine; and a controller. The controller is operationally coupled to the power inverter and the controller generates command voltages to the power inverter. The controller is also configured to: receive a voltage command, the voltage command corresponding to a voltage control command for a position control loop, the position control loop configured to control a position of the electric machine; receive a velocity signal or position signal; and determine a q-axis current. The controller is also configured to compute a d-axis current to supplement the torque if a magnitude of a voltage supply for exciting the electric machine is not sufficient to provide a torque corresponding to the q-axis current. Otherwise, the controller establishes the d-axis current at about zero. The controller is also configured to generate command voltages for controlling the electric machine corresponding to the q-axis current and the d-axis current.

Further disclosed herein in an exemplary embodiment is a system for controlling an electric machine using voltage mode control comprising: means for receiving a voltage command, the voltage command corresponding to a voltage control command for a position control loop, the position control loop configured to control a position of the electric machine; means for receiving a motor velocity signal; and means for determining a q-axis current. The system also includes means for determining; if a magnitude of a voltage supply for exciting the electric machine is not sufficient to provide a torque corresponding to the q-axis current, computing a d-axis current to supplement the torque; otherwise establishing the d-axis current at about zero; and means for generating command voltages for controlling the electric machine corresponding to the q-axis current and the d-axis current.

Also disclosed herein in yet another exemplary embodiment is a storage medium encoded with machine-readable computer program code for controlling an electric machine using voltage mode control, the storage medium including instructions for causing a computer to implement the abovementioned method.

Further, disclosed herein in another exemplary embodiment is a computer data signal, the computer data signal comprising code configured to cause a computer to implement the abovementioned method for controlling an electric machine using voltage mode control.

BRIEF DESCRIPTION OF THE DRAWINGS

Referring to the exemplary drawings wherein like elements are numbered alike in the several Figures.

DESCRIPTION OF AN EXEMPLARY EMBODIMENT

Disclosed herein in an exemplary embodiment is a method for voltage mode control of PM machine with phase advance, where the input control to the drive is a voltage command. The control algorithm first finds the q-axis component of motor current (torque producing component) from the input voltage command without and voltage limit while setting the d-axis component to zero. It then limits the toque current within the operating speed torque profile of the motor. Using the q-axis component of the current and dc bus voltage it then determines if the commanded operating point is outside the dc bus voltage range and calculates the appropriate d-axis component of current for the desired operation. Using q and d axis current it determines q and d axis voltages for the desired operating point.

Figure 1:
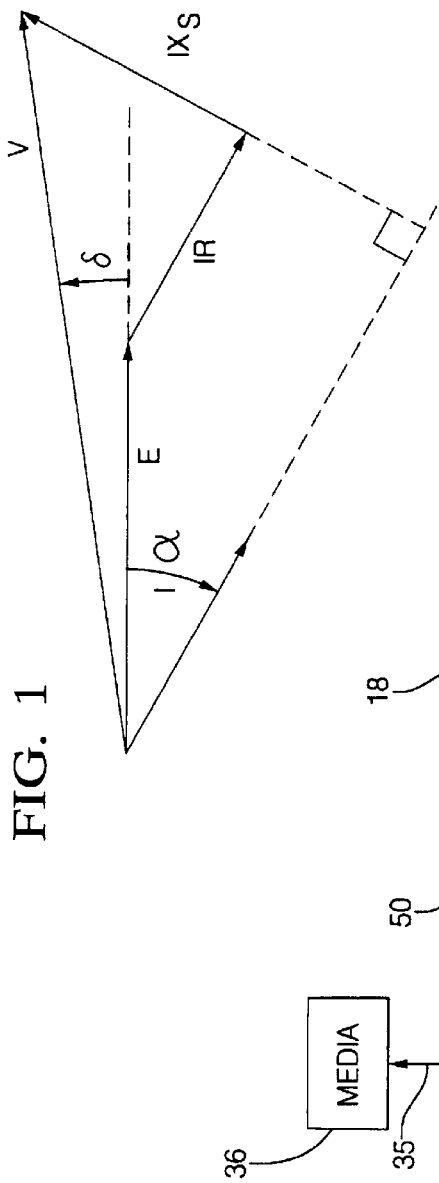
FIG. 1 is a phasor diagram of a permanent magnet motor under constant voltage excitation.

Referring to FIG. 1, there is shown a phasor diagram upon which the voltage-mode control method of the exemplary embodiments is based. Instead of controlling the torque producing current, under steady state operating condition, the voltage is commanded to regulate the position of the motor. The position to voltage equation can be described as $$V = K_1 \Delta\theta + K_2 \int \Delta\theta$$

Where V is desired command voltage $\Delta\theta$ is error in position compared to the desired position K1 and K2 are the constants, which control the response of the system.

The voltage phasor $\vec{V}$, back-emf phasor $\vec{E}$ and current phasor $\vec{I}$ of a sinusoidally excited PM motor are governed by:

$$i. \quad \vec{V} = \vec{E} + \vec{I}R + j\vec{I}X_s \quad (1)$$

where R is the winding resistance, $X_s$ is the phase reactance which is equal to the product of motor inductance $L_s$ and the excitation frequency $\omega$. Here, it is assumed that the angle between back-emf phasor $\vec{E}$ and current phasor $\vec{I}$ is $\alpha$ and the angle between the voltage phasor $\vec{V}$ and the back-emf phasor $\vec{E}$ is $\delta$. Based on the phasor diagram, it can be derived that $$V_q = I_q R + I_d X_s + K_e \omega_r \quad (2)$$

$$V_d = I_d R - I_q X_s \quad (3)$$

where $K_e = E/\omega_m$ is the EMF constant, where $\omega_m = \omega/$(no. of pole pairs). It can be seen from the equations that voltage applied to the motor is function of motor speed and torque. This is also depicted in the phasor diagram as a function of voltage and current angle. For a constant command voltage the torque current hence the torque of the motor decrease with the increase in speed. This allows the natural damping as a function of speed. Also it can be seen form the equation that the voltage command is function of toque producing current $I_q$ and the magnetizing current $I_d$. For a constant voltage and speed, setting the magnetizing current component to zero permits maximizing the torque of the motor.

In some electric steering systems, current mode control with phase advance is used in electric machines in order to extend the speed range of operation by controlling the $I_d$ component of current to reduce the effective field in the air gap. The benefit of phase advance, or field weakening control in current mode control, is in reducing inverter power rating (and hence, its cost) because of the lowered phase current In voltage mode control the field weakening can be applied if the desired command voltage is above the available bus voltage to enhance the output power thus generate the desired response from the system.

To obtain the enhanced performance from the motor, a control configuration of an exemplary embodiment is established so that:

The d-axis current is zero for command voltages less than the DC bus voltage.

For the command voltage levels above the DC bus voltage the motor current is phase advanced thus allowing additional torque needed to be produced.

The control must be limited to keep the torque and therefore the current within the limits of the operation at all speeds in all four quadrants of operation.

Figure 2:
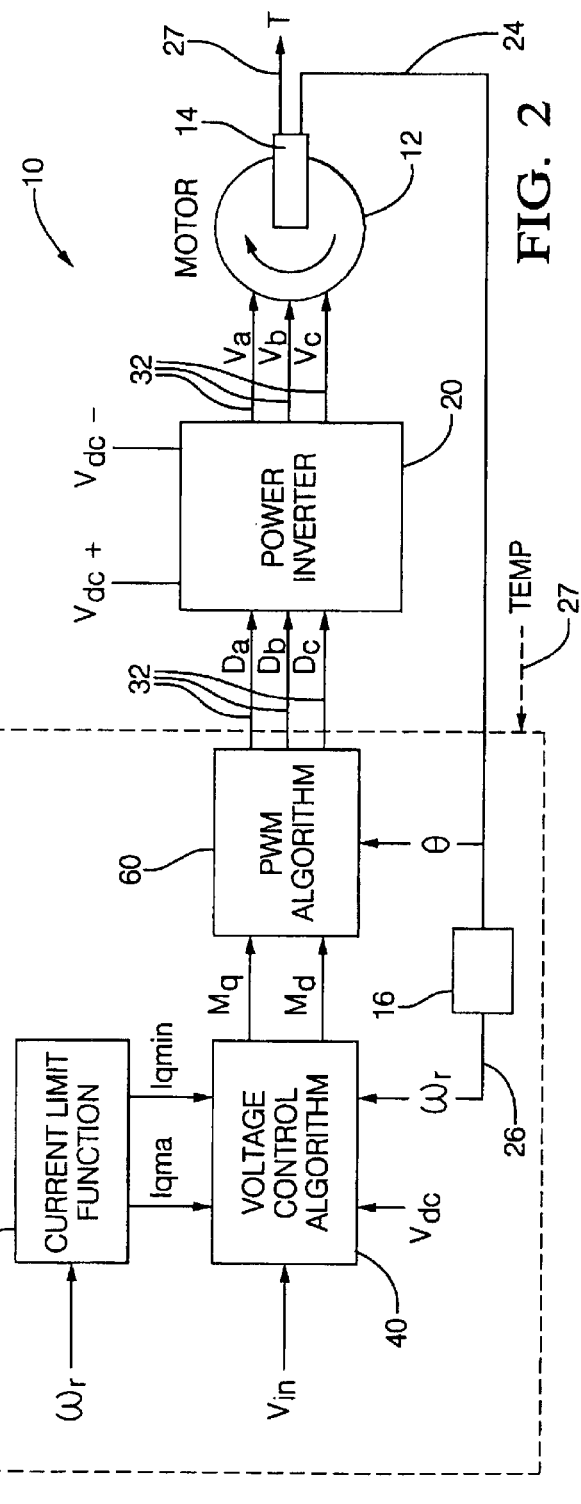
FIG. 2 is a block diagram of a system for controlling the position of an electric machine in accordance with an exemplary embodiment.

FIG. 2 depicts a detailed block diagram of a control system for controlling an electric machine. In an exemplary embodiment the system 10 is configured to control the position of an electric machine, including, but not limited to a sinusoidally excited permanent magnet motor, hereinafter referred to as motor 12. The system includes a rotor position encoder 14, an optional speed measuring circuit 16, a controller 18, a power inverter 20 and a power source 22.

The power inverter 20 is coupled between power source 22 and the controller 18 to supply the phase voltages across the motor windings. The inverter 20 is controlled by pulse width modulated signals generated by the controller 18. For the controller 18 to develop the correct voltages needed to produce/maintain the desired motor position, the position and speed of the rotor are needed. A rotor position encoder 14 is connected to the motor 12 to detect the angular position of the rotor of the motor. The encoder 14 may sense the rotary position based on electrical or optical detection or magnetic field variations, and the like, as are commonly known. The encoder 14 outputs a position signal $\theta$ at a line 24 indicating the angular position of the rotor of the electric machine.

From this position signal $\theta$, speed-measuring circuit 16 determines the speed of the rotor and outputs a speed signal $\omega_r$ at a line 26. The circuit 16 may include a counter that counts the position signal pulses for a predetermined duration. The count value is proportional to the speed of the motor. For example, if a counter counts the position signal pulses in time intervals of 5 ms and the encoder has a resolution of 2.5 degree, the speed measurement will have a resolution of about 41.7 rpm. The speed signal can also be obtained by any other method, such as the derivative of the position signal from the equation $\omega_m = \Delta\theta_m/\Delta t$ where $\Delta t$ is the sampling time and $\Delta\theta_m$ is the change in position during the sampling interval.

The controller 18 includes an existing position control algorithm 36 that generates a voltage command denoted herein as $V_{in}$ required to maintain/achieve the desired position. Details of the position control algorithm 36 are not needed for the appreciation of the scope of this invention and are therefore not provided. U.S. patent application Ser. No. 10/645,118 the contents of which are incorporated by reference herein in their entirety, describes a position control algorithm 36 as may be employed with the present invention.

The temperature of the motor 12 is optionally measured utilizing one or more temperature sensors located at the motor windings (not shown). The temperature sensor transmits a temperature signal 27 to the controller 18 to facilitate the processing prescribed herein. Typical temperature sensors include thermocouples, thermistors, thermostats, and the like, as well as combinations comprising at least one of the foregoing sensors, which when appropriately placed provide a calibratable signal proportional to the particular temperature.

The position signal $\theta$, and/or speed signal $\omega_r$, and optional temperature signal, are applied to the controller 18. The controller 18 processes all input signals to generate values corresponding to each of the signals resulting in a rotor position value, a motor speed value, a temperature value being available for the processing in the algorithms as prescribed herein. Measurement signals, such as the above mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the execution of the position control and voltage mode control algorithm(s), prescribed herein, and the like), controller 18 may include, but not be limited to, a processor(s), computer(s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Additional features of controller 18 and certain processes therein are thoroughly discussed at a later point herein.

In an exemplary embodiment, controller 18 determines a desired q-axis current and a d-axis current for the motor 12 by evaluating system and motor parameters and processing based thereon. Controller 18 receives the abovementioned input signals to facilitate the processes and as a result generates one or more output signals including an voltage command based one the desired q-axis current.

Continuing with FIG. 2, for additional details in accordance with an exemplary embodiment. The controller 18 includes a voltage control algorithm 40 driven by a voltage command $V_{in}$, which is generated in the previously mentioned position control algorithm 36. The control voltage input $V_{in}$ is fed into the voltage model control algorithm block 40, which ultimately generates modulation indices, $M_q$ and $M_d$, the q and d-axis proportional voltages as a function of motor speed $\omega_r$, and DC bus voltage $V_{dc}$. A current limiting function 50 generates maximum and minimum q axis current $I_{q\_max}$ and $I_{q\_min}$ values, which are employed by the voltage control algorithm 40 to facilitate computation of the q and d-axis voltages also denoted later herein as $V_q$ and $V_d$. These variables are also a function of motor speed $\omega_r$. The q and d axis modulation indices $M_q$ and $M_d$, are a profile for the sinusoidal scaled phase voltage (duty cycles) using motor position $\theta$ indexed to the zero crossing of the phase-A back-EMF. The modulation indices for the phase voltages 32 denoted as $D_a$, $D_b$, and $D_c$ respectively, are generated by a pulse width modulation algorithm 60, and are given by following equations:

$$D_a = M_q \cos\theta + M_d \sin\theta$$

$$D_b = M_q \cos(\theta - 120°) + M_d \sin(\theta - 120°)$$

$$D_c = M_q \cos(\theta + 120°) + M_d \sin(\theta + 120°) \qquad (4).$$

where $\theta$ is the motor position.

The modulation indices for the phase voltages $D_a$, $D_b$, and $D_c$ are applied to the power inverter 20 generating the resultant phase voltages 34 denoted as $V_a$, $V_b$, and $V_c$ respectively, as applied to the motor 12.

Figure 3:
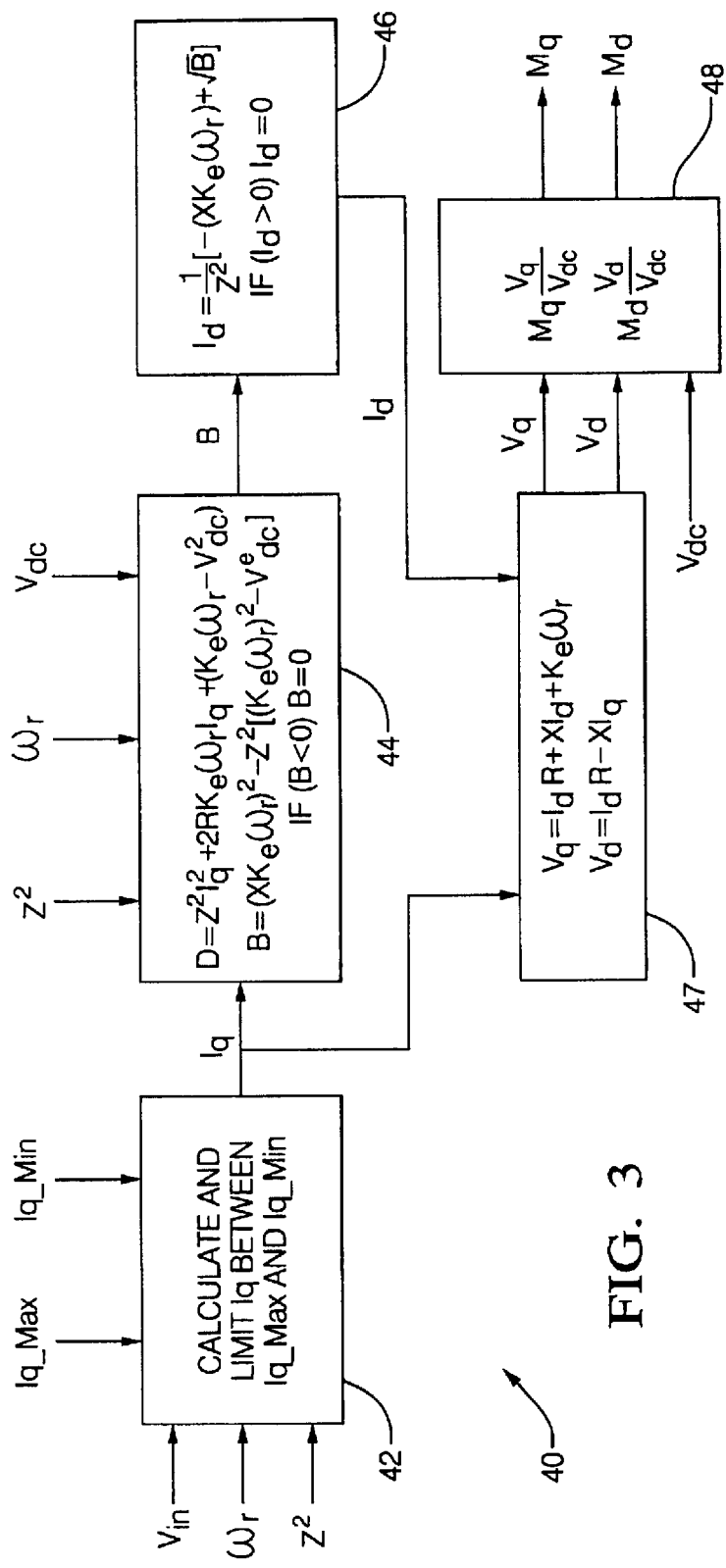
FIG. 3 is of an exemplary embodiment of the voltage control algorithm on an exemplary embodiment.

FIG. 3 depicts a block diagram of an exemplary embodiment of the voltage control algorithm 40. The voltage control algorithm 40 initiates with an $I_q$ calculation function 42. The $I_q$ calculation function 42 computes the desired q-axis motor current within a specified range using the control voltage input $V_{in}$, motor speed $\omega_r$, motor impedance $Z^2$ and maximum and minimum q-axis motor current thresholds denoted as $I_{q\_Max}$ and $I_{q\_Min}$. Additional details of the $I_q$ calculation function 42 are provided in FIG. 7 and will be addressed at a later point herein.

Figure 4:
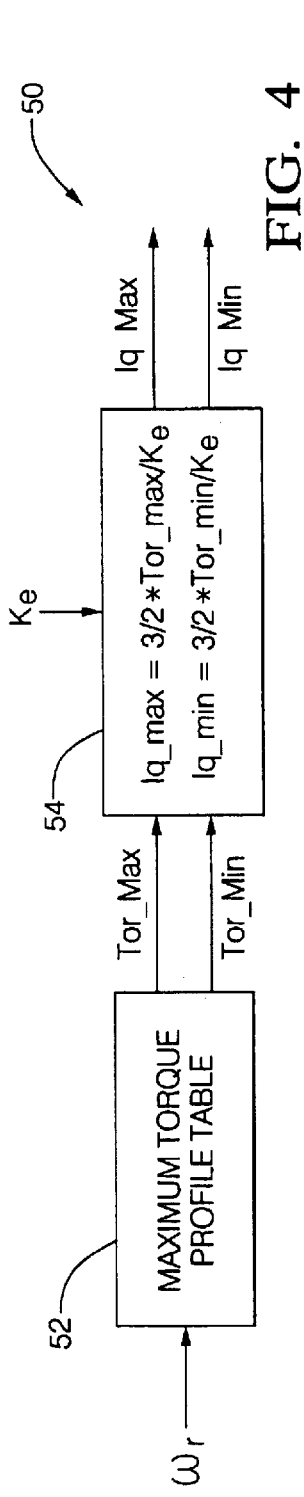
FIG. 4 is a block diagram of an exemplary current limiting function.
Figure 5:
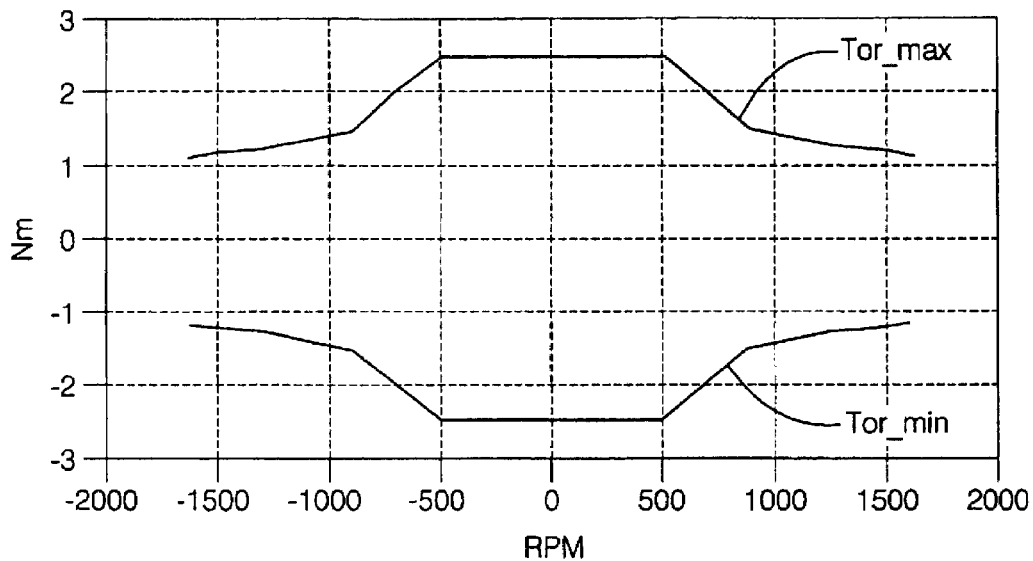
FIG. 5 provides a graph of an illustrative torque speed profile for an electric machine.

Turning momentarily to FIG. 4 block diagram depicting an exemplary current limiting function 50 is provided. In this exemplary embodiment, a maximum and minimum q-axis motor current is determined as a function of motor speed $\omega_r$. A maximum and minimum torques is established as depicted at function block 52. In an exemplary embodiment the function includes a look up table of the maximum and minimum torque profiles e.g., torque-speed curves for a given motor 12 are stored as a function of motor speed. An example of a torque speed profile is depicted as FIG. 5. The maximum and minimum torque limits are applied to a current limit algorithm 54. The current limit algorithm computes the maximum and minimum q-axis motor current thresholds as $I_{q\_Max}$ and $I_{q\_Min}$ based on the maximum and minimum torque limits and the motor constant $K_e$. The maximum and minimum q-axis motor current thresholds as $I_{q\_Max}$ and $I_{q\_Min}$ are then applied to the $I_q$ calculation function 42 of the voltage control algorithm 40.

Returning now to FIG. 3, the voltage control algorithm 40 continues with a voltage evaluation function 44. The voltage evaluation function 44 ascertains whether the available DC voltage supply 22 is sufficient to produce the torque corresponding to the desired q-axis current. In an exemplary embodiment, the determination is made by establishing two variables B and D, based on the motor equations to simplify the computation of the q-axis and d-axis currents. Once again, the determination is based on the desired q-axis current $I_q$, the motor speed $\omega_r$, motor impedance $Z^2$, and the values of the DC bus voltage $V_{DC}$. In one exemplary embodiment, the values of B and D are computed as follows:

$$D = Z^2 I_q^2 + 2RK_e\omega_r I_q + (K_e\omega_r - V_{dc}^2) \quad (5)$$

$$B = (XK_e\omega_r)^2 - Z^2((K_e\omega_r)^2 - V_{dc}^e) \text{ if}(B<0) B=0 \quad (6)$$

The value of B is then transmitted to the d-axis current determination algorithm 46. In an exemplary embodiment, at the d-axis current determination algorithm 46, if there is sufficient voltage, as ascertained at the voltage evaluation function 44, no d-axis current is needed. Conversely, if the DC voltage supply $V_{dc}$ 22 is not sufficient, the d-axis current $I_d$ required is computed based on the value B, e.g, the desired q-axis motor current $I_q$, dc bus voltage $V_{dc}$ and motor speed $\omega_r$ as shown as depicted in accordance with the equation:

$$I_d = 1/Z^2 [-(XK_e\omega_r) + \sqrt{\sqrt{B}}] \text{ if } (I_d > 0) I_d = 0 \quad (7)$$

Finally, the d-axis current $I_d$ is clamped to zero for any positive values.

Continuing with FIG. 3, the voltage control algorithm 40 continues with a voltage computation function 47. The voltage computation function 47 determines the values for the q and d-axis voltages $V_q$ and $V_d$ based on the computed values for the desired q-axis current $I_q$ from the $I_q$ calculation function 42 and the computed d-axis current $I_d$ from the d-axis current determination algorithm 46. In one exemplary embodiment, the values of $V_q$ and $V_d$ are computed as follows:

$$V_q = I_q R + XI_d + K_e\omega_r \quad (8)$$

$$V_d = I_d R - XI_q \quad (9)$$

Finally, the voltage control algorithm 40 on an exemplary embodiment concludes with a compute modulation indices algorithm 48. The computation of the q and d axis modulation indices $M_q$ and $M_d$ is based on the q and d-axis voltages $V_q$ and $V_d$, as well the DC supply voltage $V_{DC}$. In an exemplary embodiment the q and d axis modulation indices $M_q$ and $M_d$ are computed based on the equations:

$$M_q = \frac{V_q}{V_{dc}} \quad (10)$$

$$M_d = \frac{V_d}{V_{dc}} \quad (11)$$

Figure 6:
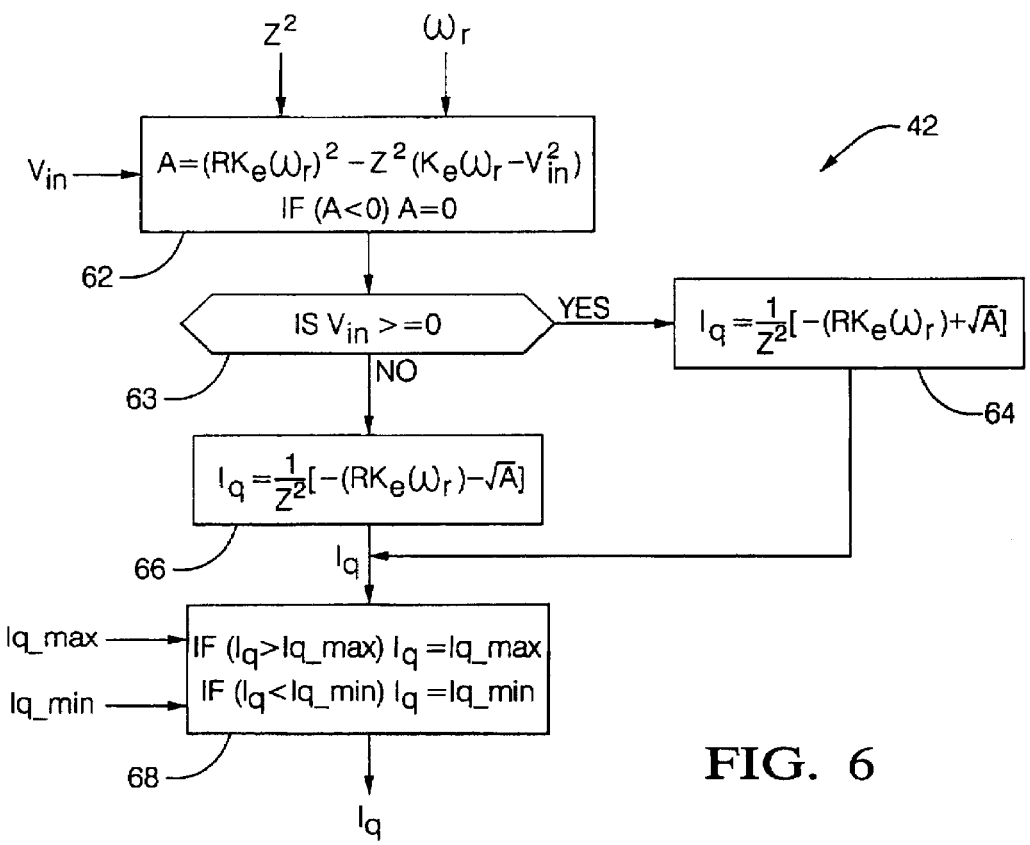
FIG. 6 provides a detailed block diagram of the Iq calculation function.

FIG. 6 shows the detailed block diagram of the $I_q$ calculation function 42. As stated earlier, the $I_q$ calculation function 42 computes the desired q-axis motor current within a specified range using the control voltage input $V_{in}$, motor speed $\omega_r$, motor impedance $Z^2$ and maximum and minimum q-axis motor current thresholds denoted as $I_{q\_Max}$ and $I_{q\_Min}$. In an exemplary embodiment, the impedance input $Z^2$ represents the motor impedance given by:

$$Z^2 = R^2 + (P/2\omega_r L)^2 \quad (12)$$

where P is the number of motor poles. As stated earlier, the voltage command $V_{in}$, is generated by an existing position control algorithm 36. It will be appreciated that value for the control voltage input $V_{in}$ to this algorithm is permitted to exceed the DC voltage level of the DC voltage supply $V_{dc}$ 22 to facilitate the calculation of the desired q-axis current $I_q$. Therefore, there is no limit on the variable.

In an exemplary embodiment, to facilitate a computation of the desired q-axis current $I_q$ a variables A is established once again based on the motor equations to simplify the computation of the q-axis current. The variable A is calculated as depicted at function block 62. In one exemplary embodiment, the values of B and D are computed as follows:

$$A = (RK_e\omega_r)^2 - Z^2(K_e\omega_r - V_{in}^2) \text{ If}(A<0) A=0 \quad (13)$$

Function blocks 63, 64, and 65 depict the formulation employed for determination of the desired q-axis current $I_q$, based on the sign of the voltage command $V_{in}$. The d-axis current is set to zero for $I_q$ calculation. Finally the calculated desired motor current is Iq is limited between the established thresholds of $I_{q\_max}$ and $I_{q\_min}$ from the current limiting function 50.

With regard to sensitivity to temperature, it is known that temperature affects both the magnetic field, because of magnet sensitivity, and the winding resistance. Both are used in the above equations to compute the motor voltage and its angle. For the winding resistance sensitivity, the best approach is to use an estimated/measured resistance or use the temperature coefficient to modify the resistance values used (in case temperature is available), such as by using the equation:

$$ii. \quad R = R_r(1 + \alpha\Delta T) \quad (24)$$

where

R is an actual resistance, $R_r$ is the resistance at room temperature, $\Delta T$ is the temperature difference between the temperature of interest and room temperature, and $\alpha$ is the temperature resistivity coefficient.

In regard to the magnet temperature, it can be estimated from the winding temperature and used to modify the back-emf constant of the machine.

The invention can be embodied in the form of computer-implemented processes and apparatuses for practicing those processes. The invention can also be embodied in the form of computer program code containing instructions embodied in tangible media 36, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, embodied in a data signal 35 for example, whether stored in a storage medium, whether modulated or not, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A method of controlling an electric machine using voltage mode control comprising:

receiving a voltage command, said voltage command corresponding to a voltage control command for a position control loop, said position control loop configured to control a position of the electric machine;

receiving a motor velocity signal;

determining a q-axis current;

if a magnitude of a voltage supply for exciting the electric machine is not sufficient to provide a torque corresponding to said q-axis current, computing a d-axis current to supplement said torque; otherwise establishing said d-axis current at about zero; and generating command voltages for controlling the electric machine corresponding to said q-axis current and said d-axis current.

2. The method of claim 1 further including:

establishing a first threshold for said q-axis current;

establishing a second threshold for said q-axis current; and limiting said q-axis current to between about said first threshold and about said second threshold.

3. The method of claim 2 wherein said first threshold corresponds to about a maximum value for said q-axis current.

4. The method of claim 2 wherein said second threshold corresponds to about a minimum value for said q-axis current.

5. The method of claim 2 wherein said first threshold and said second threshold are based on known torque speed profiles for the electric machine.

6. The method of claim 1 further comprising receiving a position signal indicative of a position of the electric machine.

7. The method of claim 6 wherein said velocity signal is based on said position signal.

8. The method of claim 1 wherein said determining is based on said voltage command, a velocity of the electric machine and an impedance of the electric machine.

9. The method of claim 8 wherein said determining corresponds to an optimum torque based on a torque-speed profile for the electric machine.

10. The method of claim 8 wherein said computing a d-axis current to supplement said torque corresponds to an optimum phase advance angle for said voltage command.

11. The method of claim 1 wherein said generating command voltages is maintained within torque or current limits for the electric machine.

12. The method of claim 1 further including compensating variations of resistance of the electric machine by:

measuring a temperature of a winding of the electric machine; and calculating an actual resistance as;

$$R = R_r(1 + \alpha \Delta T);$$

where; R is said actual resistance, $R_r$ is said phase resistance at room temperature, $\alpha$ is a temperature sensitivity coefficient, and $\Delta T$ is a difference between said measured temperature and room temperature.

13. A voltage mode control system for an electric machine comprising:

a power inverter operationally connected to the electric machine;

a position sensor operationally connected to the electric machine, said position sensor configured to transmit a signal indicative of position of the electric machine;

a controller, said controller operationally coupled to said power inverter, said controller generating command voltages to said power inverter, said controller configured to:

receive a voltage command, said voltage command corresponding to a voltage control command for a position control loop, said position control loop configured to control a position of the electric machine;

receive a velocity signal or position signal;

determine a q-axis current;

if a magnitude of a voltage supply for exciting the electric machine is not sufficient to provide a torque corresponding to said q-axis current, computing a d-axis current to supplement said torque; otherwise establishing said d-axis current at about zero; and generating command voltages for controlling the electric machine corresponding to said q-axis current and said d-axis current.

14. The system of claim 13 further including said controller:

establishing a first threshold for said q-axis current;

establishing a second threshold for said q-axis current; and limiting said q-axis current to between about said first threshold and about said second threshold.

15. The system of claim 14 wherein said first threshold corresponds to about a maximum value for said q-axis current.

16. The system of claim 14 wherein said second threshold corresponds to about a minimum value for said q-axis current.

17. The system of claim 14 wherein said first threshold and said second threshold are based on known torque speed profiles for the electric machine.

18. The system of claim 13 wherein said velocity signal is based on said position signal.

19. The system of claim 1 wherein said q-axis current is determined based on said voltage command, a velocity of the electric machine and an impedance of the electric machine.

20. The system of claim 19 wherein said q-axis current corresponds to an optimum torque based on a torque-speed profile for the electric machine.

21. The system of claim 19 wherein said d-axis current corresponds to an optimum phase advance angle for said voltage command.

22. The system of claim 1 wherein said command voltages are maintained within torque or current limits for the electric machine.

23. The system of claim 13 further including a temperature sensor configured to facilitate compensating variations of resistance of the electric machine.

24. A system for controlling an electric machine using voltage mode control comprising:

means for receiving a voltage command, said voltage command corresponding to a voltage control command for a position control loop, said position control loop configured to control a position of the electric machine;

means for receiving a motor velocity signal;

means for determining a q-axis current;

means for determining; if a magnitude of a voltage supply for exciting the electric machine is not sufficient to provide a torque corresponding to said q-axis current, computing a d-axis current to supplement said torque; otherwise establishing said d-axis current at about zero; and means for generating command voltages for controlling the electric machine corresponding to said q-axis current and said d-axis current.

25. A storage medium encoded with machine-readable computer program code for controlling an electric machine using voltage mode control, said storage medium including instructions for causing a computer to implement a method comprising:

receiving a voltage command, said voltage command corresponding to a voltage control command for a position control loop, said position control loop configured to control a position of the electric machine;

receiving a motor velocity signal;

determining a q-axis current;

if a magnitude of a voltage supply for exciting the electric machine is not sufficient to provide a torque corresponding to said q-axis current, computing a d-axis current to supplement said torque; otherwise establishing said d-axis current at about zero; and generating command voltages for controlling the electric machine corresponding to said q-axis current and said d-axis current.

26. A computer data signal, said computer data signal comprising code configured to cause a computer to implement a method for controlling an electric machine using voltage mode control comprising:

receiving a voltage command, said voltage command corresponding to a voltage control command for a position control loop, said position control loop configured to control a position of the electric machine;

receiving a motor velocity signal;

determining a q-axis current;

if a magnitude of a voltage supply for exciting the electric machine is not sufficient to provide a torque corresponding to said q-axis current, computing a d-axis current to supplement said torque; otherwise establishing said d-axis current at about zero; and generating command voltages for controlling the electric machine corresponding to said q-axis current and said d-axis current.

* * * * *